United States Patent
Nakano et al.

(10) Patent No.: US 7,290,010 B2
(45) Date of Patent: Oct. 30, 2007

(54) SERVICE PROVIDING RETRIEVAL SYSTEM USING COMPUTER NETWORK

(75) Inventors: Toshiaki Nakano, Tokyo (JP); Takuya Masamura, Naperville, IL (US)

(73) Assignees: Pioneer Corporation, Tokyo (JP); Increment P Corporation, Tokyo (JP)

(*) Notice: Subject to any disclaimer, the term of this patent is extended or adjusted under 35 U.S.C. 154(b) by 0 days.

(21) Appl. No.: 09/773,550

(22) Filed: Feb. 2, 2001

(65) Prior Publication Data
US 2001/0013031 A1    Aug. 9, 2001

(30) Foreign Application Priority Data
Feb. 3, 2000  (JP) ............... 2000-026482

(51) Int. Cl.
*G06F 17/00* (2006.01)
(52) U.S. Cl. ............... 707/104.1; 707/100; 705/26
(58) Field of Classification Search ......... 707/1–104.1; 705/8, 26, 6; 709/217
See application file for complete search history.

(56) References Cited

U.S. PATENT DOCUMENTS

| | | | | |
|---|---|---|---|---|
| 5,682,525 A | * | 10/1997 | Bouve et al. | 707/104.1 |
| 5,930,474 A | * | 7/1999 | Dunworth et al. | 709/217 |
| 5,948,040 A | * | 9/1999 | DeLorme et al. | 701/201 |
| 5,991,739 A | * | 11/1999 | Cupps et al. | 705/26 |
| 6,025,843 A | * | 2/2000 | Sklar | 715/841 |
| 6,040,824 A | * | 3/2000 | Maekawa et al. | 345/173 |
| 6,047,327 A | * | 4/2000 | Tso et al. | 709/232 |
| 6,055,536 A | * | 4/2000 | Shimakawa et al. | 707/101 |
| 6,115,611 A | * | 9/2000 | Kimoto et al. | 455/456.3 |
| 6,141,666 A | * | 10/2000 | Tobin | 715/513 |
| 6,263,343 B1 | * | 7/2001 | Hirono | 707/104.1 |
| 6,282,493 B1 | * | 8/2001 | Kitagawa et al. | 701/211 |
| 6,341,353 B1 | * | 1/2002 | Herman et al. | 726/5 |
| 6,356,874 B1 | * | 3/2002 | .O slashed.hrn | 705/6 |
| 6,484,150 B1 | * | 11/2002 | Blinn et al. | 705/26 |
| 6,983,313 B1 | * | 1/2006 | Korkea-Aho | 709/219 |
| 2002/0010608 A1 | * | 1/2002 | Faber et al. | 705/8 |
| 2002/0032674 A1 | * | 3/2002 | Semple et al. | 707/3 |
| 2002/0038180 A1 | * | 3/2002 | Bellesfield et al. | 701/202 |
| 2003/0139969 A1 | * | 7/2003 | Scroggie et al. | 705/26 |

FOREIGN PATENT DOCUMENTS

JP            2956587        * 10/1999

* cited by examiner

*Primary Examiner*—Don Wong
*Assistant Examiner*—Linh Black
(74) *Attorney, Agent, or Firm*—Arent Fox LLP

(57) ABSTRACT

A retrieval site (S1) comprises a retrieval server (S1*a*), a retrieval database (S1*b*) and a registered fast-food shop database (S1*c*). Based on a designation entry of a merchandise genre and a destination from an information terminal (T) having connected with the retrieve site (S1), the retrieval server (S1*a*) retrieves fast-food shops (F), having a service providing area including the designated destination, from the retrieval database (S1*b*), and displays the retrieved list of the corresponding shops on the information terminal. After a fast-food shop (F) is selected from the list, the retrieval server (S1*a*) retrieves data of an order form (D) from the registered fast-food shop database (S1*c*), and displays it on the information terminal. When an order is made based on the order form (D), the order contents are sent to the selected shop.

2 Claims, 4 Drawing Sheets

HOMEPAGE OF PIZZA SHOP "ABC"

```
WELCOME TO PIZZA SHOP
"ABC"

TO ORDER SCREEN
```
~HP (ORDER SCREEN)

```
MENU
△△△PIZZA  ¥1500  _____ SHEET
▲▲▲PIZZA  ¥2000  _____ SHEET
☆☆☆PIZZA  ¥2500  _____ SHEET
◎◎◎PIZZA  ¥2500  _____ SHEET

ORDER
```
~OD (ORDER CONFIRMATION SCREEN)

```
ORDER CONTENTS
 △△△PIZZA   1  SHEET  ¥1500
 ◎◎◎PIZZA   2  SHEET  ¥5000
           TOTAL AMOUNT ¥6500

ORDER
```
~CM (MAP IMAGE)

~M

SERVICE PROVIDING RETRIEVAL SYSTEM USING COMPUTER NETWORK

BACKGROUND OF THE INVENTION

1. Field of the Invention

The invention relates to a retrieval system using a computer network in order to retrieve service facilities included in a service providing area for a certain service designated by a user.

2. Description of the Related Art

In recent years, home delivery services and the like for various merchandises have achieved widespread use. Users make an order or sign up for a desired service to a facility such as a shop or the like by telephone or the like to use the service.

For such a home delivery service and the like, there are various services. Examples include a pizza delivery service, a pickup service of a package delivery, a dispatching service of a taxi etc. Any service is a convenience in that the user can receive such a service at home. Such convenience will further promote the continued use of this type of home delivery service.

Conventionally, when the user desires such home deliver service, for example, if the user is making an order a deliver service of a pizza, he/she must look up in e.g. a telephone directory, a shop or the like that provides the pizza delivery service. The user must also verify if the shop's service area includes the user's desired delivery location (e.g. the user's home) or the like, and then he/she can make an order or the like.

If the desired delivery location for service is out of the service area of the shop or the like to which the user made a call, the user will have to look up another shop and makes a call again. Situation in which the user cannot find shops capable of providing the desired service readily is common.

SUMMARY OF THE INVENTION

The present invention has been made for solving the problems arising when a user desires a service having a service providing area as described above.

It is therefore an object of the present invention to provide a service providing area retrieval system using a computer network (e.g. Internet) in which when a user desire a service having a service providing area, the user can readily find shops capable of providing the desired service.

To attain the above object, a service providing area retrieval system using the computer network according to a first invention, features in that a retrieval site connected to the computer network comprises a retrieval server; a retrieval database storing data on genres of handled merchandises and service providing areas of registered shops; and a registered shop database storing service request data of each shop registered for the retrieval database, in which the retrieval server of the retrieval site retrieves shops capable of providing a service from the retrieval database in correspondence with an entry of a desired merchandise genre and a service providing shop from an information terminal having connected to the retrieval site; displays the retrieved list of the corresponding shops on the information terminal; after a shop is selected based on the list, retrieves the service request data of the selected shop from the registered shop database; displays the service request data on the information terminal; and then after an entry for requesting a service based on the service request data, sends the entered service contents to the selected shop.

According to the service providing area retrieval system using the computer network of the first invention, when the user connects the information terminal through the computer network (e.g. Internet) to the retrieval site, and designates the desired merchandise genre and the destination for receiving the service on the displayed WWW page of the retrieval site, the retrieval server of the retrieval site retrieves shops handling a merchandise included in the designated genre and having the service providing area for merchandises including the designated destination, from store data stored in the retrieval database, and displays the retrieved list on the information terminal.

Upon the user selecting a shop based on the list, the retrieval server retrieves the service request data of the selected shop from the registered shop database, and display the retrieved data on the information terminal.

Upon the user requesting a desired service based on the service request data, the retrieval server sends the service request contents to the selected shop. This allows the selected shop to provide the merchandise service to the destination designated by the user.

Therefore, according to the first invention, when the user requests for providing the service of the home delivery of the merchandise or the like, the user can easily and quickly find a shop capable of providing the service. The shops or the like can achieve the sales promotion and also save the shop trouble of responding to inquiries such as whether it is possible to provide the delivery service.

To attain the above object, the service providing area retrieval system using the computer network according to a second invention features, in addition to the configuration of the first invention, in that the retrieval site further includes a registered user database storing user information, to retrieve user information from the registered user database based on an entry on the information terminal, and retrieve the list of shops capable of providing the service and the service request data based on the retrieved user information.

According to the service providing area retrieval system using the computer network of the second invention, the information on the user using the system is registered in the registered user database of the retrieval site in advance, or the user information on the user having used the system is registered in the registered user database.

For this reason, when the registered user uses the system next time, the user information of the user is read out from the registered user database by the retrieval server, and the list of shops capable of providing the service and the service request data of the shops are retrieved based on the above user information. Hence, the user does not need to enter the user information as occasion demands. This saves the user trouble, resulting in a prompt request for providing the service.

To attain the aforementioned object, the service providing area retrieval system using the computer network according to a third invention features, in addition to the configuration of the first invention, in that a map database site connected to the computer network includes a map server and a map information database storing map image data, in which an entry of a destination of the provided service on the information terminal is performed on a map image displayed based on the map information data read out from the map information database by the map server of the map database site.

According to the service providing area retrieval system using the computer network of the third invention, when the user enters the destination where the user receives the service, the information terminal connects to the map database site.

The map image is displayed on the information terminal based on the map image data read out from the map information database by the map server of the map database. On the displayed map image, the user designates the desired destination for receiving the service with a pointer for the entry of the destination.

Thus, the user can easily designate the destination, while the shop can be readily check the destination.

To attain the aforementioned object, the service providing area retrieval system using the computer network according to a fourth invention features, in that a retrieval site connected to the computer network includes: a retrieval server and a retrieval database storing data of genres of handled merchandises and service providing areas of registered shops; and a shop site connected to the computer network and including a shop server, a merchandise information database storing service request data of the shops, in which the retrieval server of the retrieval site retrieves shops capable of providing service from the retrieval database in correspondence with an entry of a desired merchandise genre and a service providing shop from an information terminal having connected to the retrieval site, and displays the retrieved list of the corresponding shops on the information terminal, and after a shop is selected from the list, connect the information terminal to the shop site of the selected shop, and in which the shop site connected with the information terminal displays a service request screen on the information terminal based on merchandise information data read from the merchandise information database by the shop server.

According to the service providing area retrieval system using the computer network of the fourth invention, the user connects the information terminal through the computer network to the retrieval site, and designates the desired merchandise genre and the destination where the user receives the merchandise service, on the displayed WWW page of the retrieval site. Then the retrieval server of the retrieval site retrieves shops handling the merchandise included in the designated genre and having the service providing area for the merchandise including the designated destination for receiving the service, from the store data stored in the retrieval database, and then displays the retrieved list on the information terminal.

The user selects a shop based on the retrieved list, whereupon the retrieval server of the retrieval site connects the information terminal to the shop site managed by the selected shop.

The shop site displays the service request screen based on the merchandise information data read out from the merchandise information database by the shop server. The user enters order of the desired merchandise and the destination in accordance with the service request screen.

In consequence, according to the fourth invention, when the user requests for providing the service of delivering the merchandise or the like, the user can easily and quickly find shops capable of providing the service. Further, the shops or the like can achieve the sales promotion and also save the shop trouble of responding to inquiries such as whether it is possible to provide the delivery service.

To attain the aforementioned object, the service providing area retrieval system using the computer network according to a fifth invention features, in addition to the configuration of the fourth invention, in that the retrieval site further includes a registered user database storing user information, to retrieve user information from the registered user database based on an entry on the information terminal, and retrieve the list of shops capable of providing the service and the service request data based on the retrieved user information.

According to the service providing area retrieval system using the computer network of the fifth invention, the information of the user using the system is registered in the registered user database of the retrieval site in advance, or the user information of the user having used the system is registered in the registered user database.

For this reason, when the registered user uses the system next time, the user information of the user is read out from the registered user database by the retrieval server, and the list of shops capable of providing the service and the service request data of the shops are retrieved based on the above user information. Hence, the user does not need to enter the user information as occasion demands. This save the user trouble, resulting in a prompt request for providing the service.

To attain the aforementioned object, the service providing area retrieval system using the computer network according to a fifth invention features, in addition to the configuration of the fourth invention, in that a map database site includes a map server and a map information database storing map image data and connected to the computer network, in which an entry of a destination of the provided service on the service request screen displayed on the information terminal is performed on a map image displayed based on the map information data read out from the map information database by the map server of the map database site.

According to the service providing area retrieval system using the computer network of the sixth invention, when the user enters the destination where the user receives the service, the information terminal connects to the map database site.

The map image is displayed on the information terminal based on the map image data read out from the map information database by the map server of the map database site. On the displayed map image, the user designates the desired destination for receiving the service with a pointer for the entry of the destination.

Thus, the user can easily designate the destination, while the shop can readily check the destination.

These and other objects and advantages of the present invention will become obvious to those skilled in the art upon review of the following description, the accompanying drawings and appended claims.

DETAILED DESCRIPTION OF THE PREFERRED EMBODIMENT

Most preferred embodiment according to present invention will be described below in detail with reference to the accompanying drawings.

Figure 1:
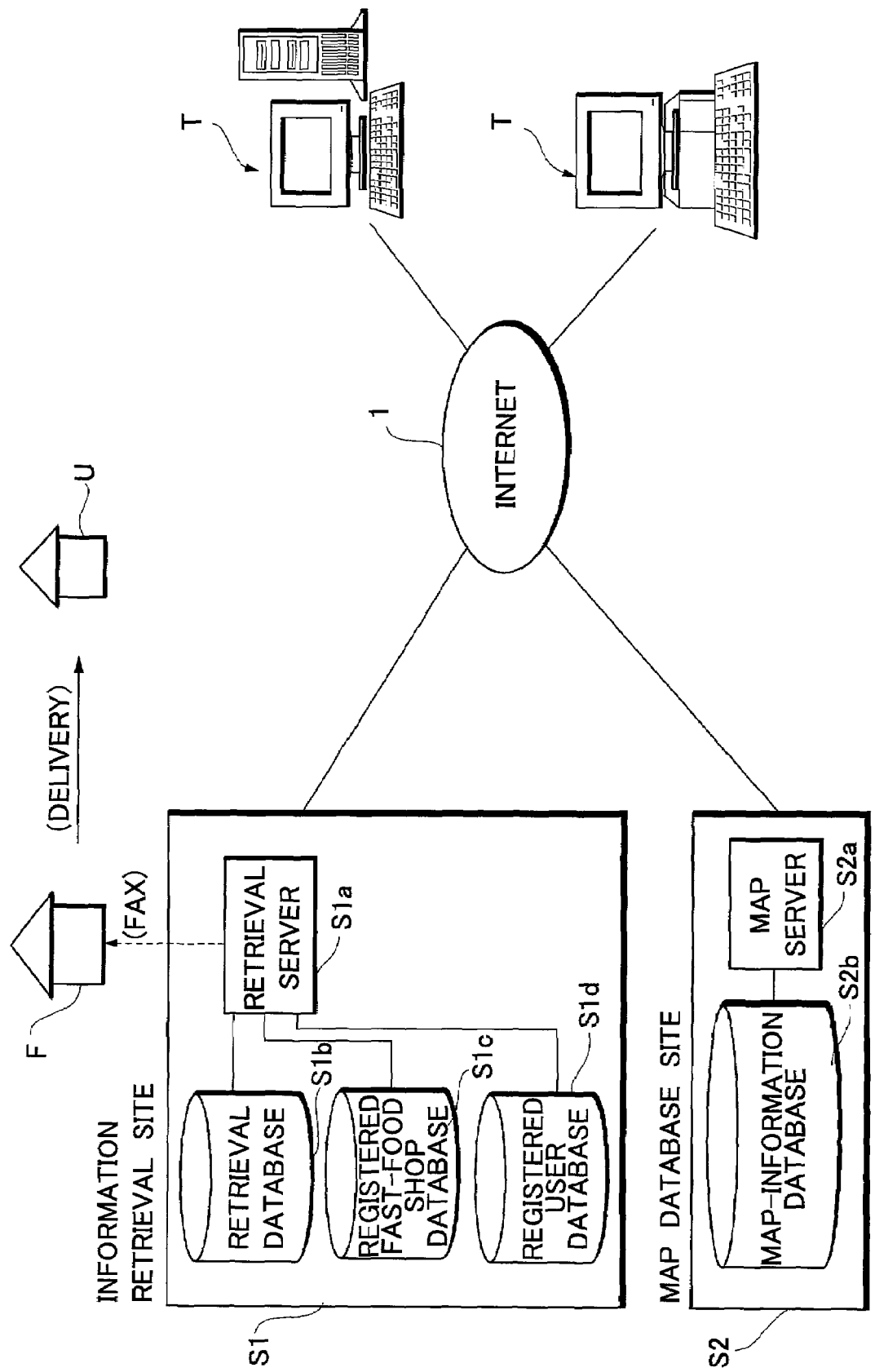
FIG. 1 is a system block diagram showing an example of an embodiment according to the present invention.

FIG. 1 is a system block diagram showing an example of an embodiment of a service providing area retrieval system according to the present invention.

It should be mentioned that the service providing area retrieval system is appliable to a wide variety of services provided in service providing areas of the service providers, such as a package delivery service of various merchandises, a pickup service of the package delivery, and a dispatching service of a taxi, but the following description is given for a fast-food home delivery service, such as pizza and sushi.

In FIG. 1, an information retrieval site S1 is for providing a service for when a user makes an order for fast-food home delivery such as pizza. The site S1 includes a retrieval server S1a, a retrieval database S1b, a registered fast-food shop database S1c, and a registered user database S1d, and connected to an Internet I.

A user connects an information terminal T, or a user terminal, to the Internet I via the public switched phone network and an access server (not shown), and uses an application program referred as a WWW browser to connect the information retrieval site S1, and then can use the retrieval service for home delivery provided by the information retrieval site S1.

The internet I is connected to a map database site S2 including a map server S2a retrieving a map image data for supplying the map image data to the information terminal T, and a map information database S2b storing the map image data.

The retrieval server S1a of the information retrieval site S1 is programmed to, upon the information terminal T connecting thereto via the Internet I, transmit HTML data for displaying a WWW page for retrieving the fast-food shop to the information terminal T.

The retrieval database S1b stores data on categories of merchandises (e.g. pizza, sushi) sold by each registered fast-food shops, and delivery areas (service providing area) of the respective fast-food shops.

The registered fast-food shop database S1c stores registration data on an order page including a menu of each registered fast-food shop.

The registered user database S1d stores data on user information registered in advance.

Figure 2:
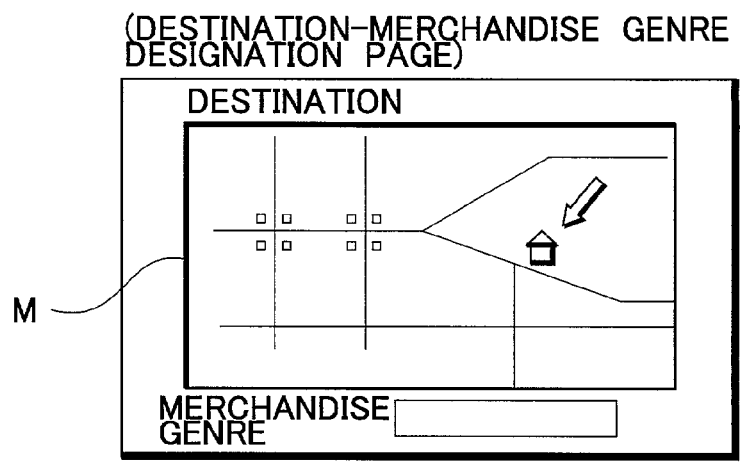
FIGS. 2A to 2C are explanatory diagrams showing an example of a screen displayed on an information terminal in the example.
Figure 2:
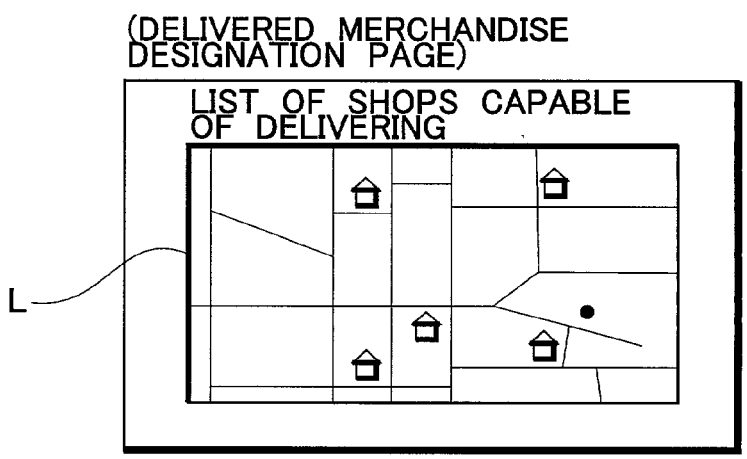
Figure 2:
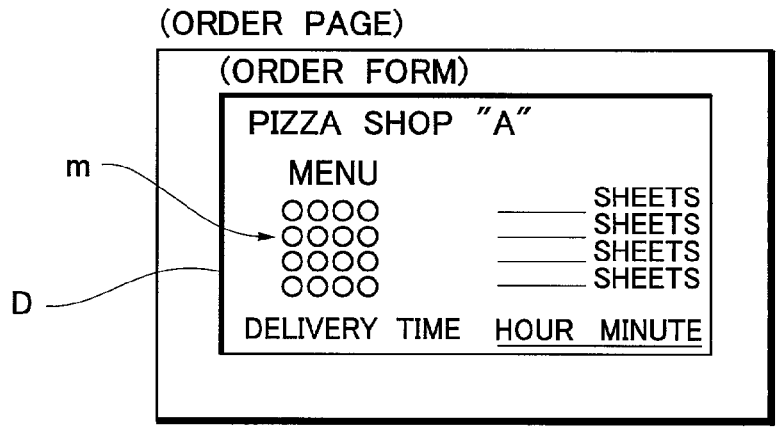

Next, manipulation when the above service providing area retrieval system is used to retrieve the fast-food shops satisfied with delivery-requirements for making an order is explained with reference to FIGS. 2A-2C illustrating a WWW page displayed on the information terminal T.

FIGS. 2A-2C illustrate an example when a destination is designated on a map screen displayed on the WWW page as described later.

When a user uses the service providing area retrieval system, he/she designates a URL to connect the information terminal T to the information retrieval site S1 to display a WWW page of the information retrieval site S1.

On the WWW page, a category of the fast-food merchandise to be ordered (e.g. a pizza, sushi) is designated and also a destination is designated.

At this time, there are two ways for designating the destination: the user directly enters an address of the destination on the WWW page; and a map image of an area including the destination is displayed on the WWW page and the destination is designated on the map image.

In the way of designating the destination on the map image, the user designates, for example, a name of area including the destination on the WWW page. Then the information terminal T connects to the map database site S2 via the Internet I based on a URL of the map database site S2 supplied from the retrieval server S1a, and receives map image data, read out from the map information database S2b by the map server S2a, from the map database site S2, and then displays a map image M designating the destination, on the WWW page as illustrated in FIG. 2A.

In this way, the merchandise genre, such as a pizza, to be ordered and the destination are designated. Thereafter, data showing the designated merchandise genre and coordinate data of a latitude and a longitude on the map image showing the destination (or HTML data showing a character string of an address when the address is designated), are sent to the retrieval server S1a of the information retrieval site S1.

Then, based on the coordinate data on the map image (or HTML data showing the character string of the address) sent from the information terminal T, the retrieval server S1a retrieves and read out fast-food shops, having a delivery service for the service providing area (delivery area) including the designated destination and the fast-food merchandise of the designated merchandise genre, from the retrieval database S1b. Then the retrieval server S1a transfers the resulting list data to the information terminal T to display it on the WWW page.

At this time, as illustrated in FIG. 2B, on the WWW page, the fast-food shops capable of delivering may be indicated with landmarks on the map image.

Then, the user selects a desired fast-food shop to make an order on a list screen L for the fast-food shops displayed on the WWW page of the information terminal T.

Upon selection of the fast-food shop for the order, the retrieval server S1a retrieves and reads out the registered data on the selected fast-food shop from the registered fast-food shop database S1c, and sends the read-out registered data to the information terminal T to display an order form D with a menu m of the fast-food shop on the WWW page as illustrated in FIG. 2C.

Then, on the order form D displayed on the WWW page, the user enters the selection and the number of merchandises to be ordered and also necessary information such as a delivery time for placing the order.

After the order manipulation, the entered order data is sent to the retrieval server S1a of the information retrieval site S1, and further transmitted together with the address of the designated destination U and the map from the retrieval server S1a to the fast-food shop F selected by the user by transmitting means such as facsimile machines.

Then, the fast-food shop F delivers the ordered merchandise to the destination U based on the order form D, the address and the map of the destination U having been sent from the information retrieval site S1.

In the above description, if the user using the service providing area retrieval system registers the user information of user's address and name and the like for the registered user database S1d of the information retrieval site S1, alternatively if the user-directory database S1d is designed to store the entered data every time the user uses the service providing area retrieval system to make an order for fast-food merchandise, when the user uses the service providing area retrieval system next time, the user can connect to the information retrieval site S1 by entering his/her ID or a pass word, if necessary on the information terminal T. With this being, since the information retrieval site S1 recognizes the user's address and the like based on the register data on the user read out from the registered user database S1d, it is possible to save the user trouble of entry of an address of destination or designating a location on the map for each order.

As described above, when the user uses the above service providing area retrieval system to request delivery of a desired merchandise or the like, the user can easily and quickly find shops capable of home-delivering the desired merchandise. Further, the shops or the like can achieve the sales promotion and also save the shop trouble of responding to inquiries such as whether it is possible to provide the delivery service.

Figure 3:
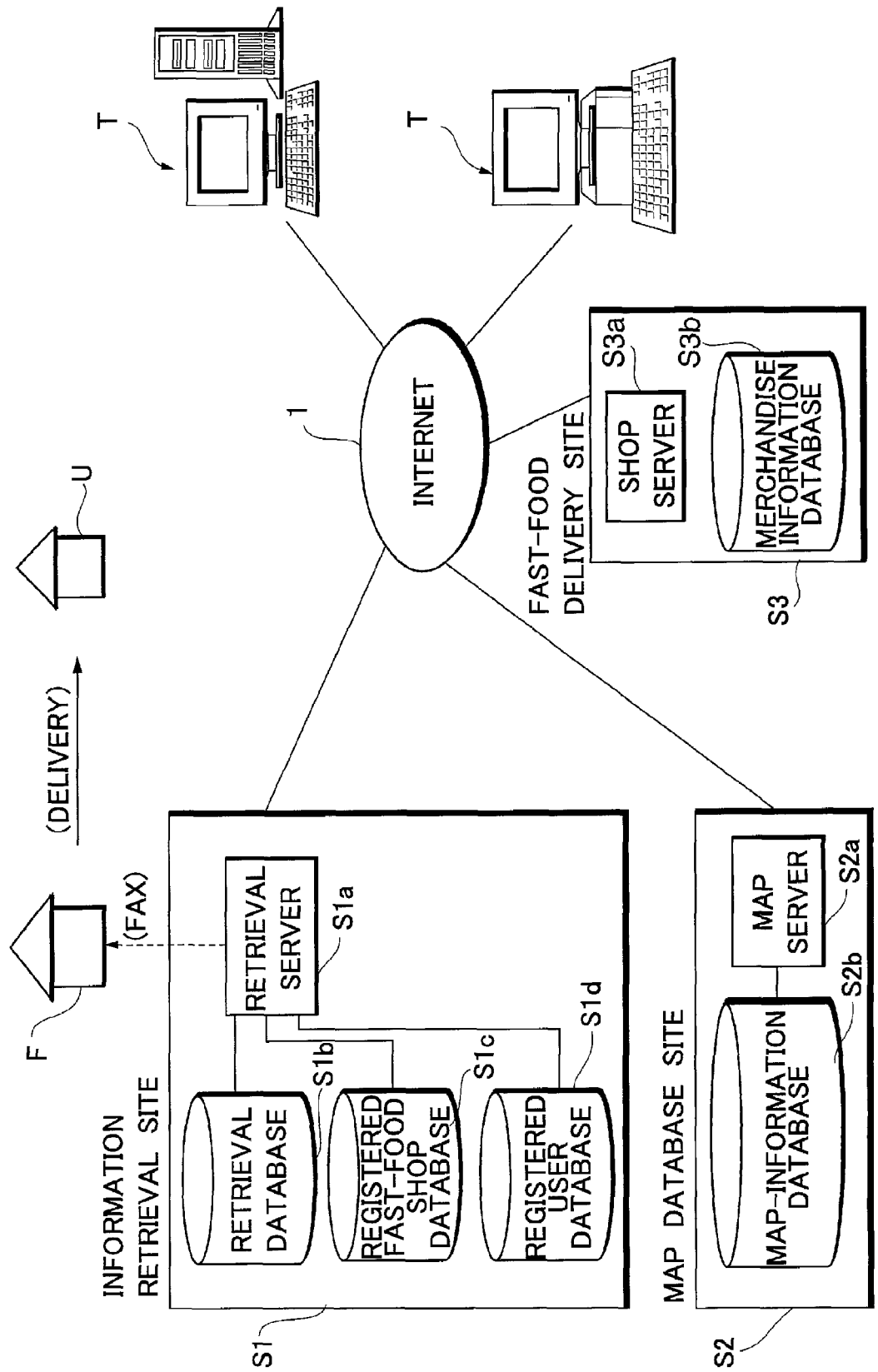
FIG. 3 is a system block diagram showing another example of the embodiment according to the present invention.

FIG. 3 illustrates system configuration when the fast-food shops manage the respective fast-food shop delivery sites S3 connected to the Internet I.

In FIG. 3, the fast-food shop delivery site S3 includes a shop server S3a and a merchandise information database S3b storing information on merchandises handled by each shop.

It should be noted that configurations of the information retrieval site S1 and the map database site S2 are similar to those in the service providing area retrieval system of the example as illustrated in FIG. 1.

In the service providing area retrieval system illustrated in FIG. 3, a user connects an information terminal T to an information retrieval site S1, and performs the manipulations until selecting a fast-food shop to make an order (manipulations until FIG. 2B) following the same steps as those in the case of FIG. 1. When the selected shop manages the fast-food shop delivery site S3, the information terminal T connects to the fast-food shop delivery site S3 of the selected shop based on a URL sent from the information retrieval site S1.

Figure 4:
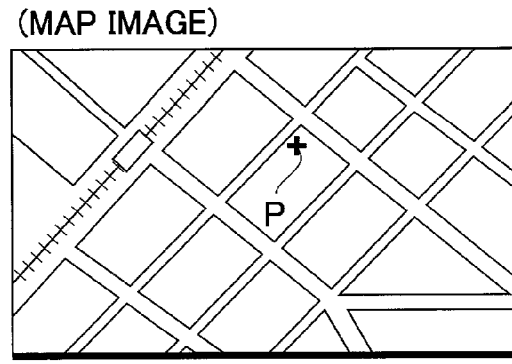
FIGS. 4A to 4D are explanatory diagrams showing an example of a screen displayed on an information terminal in the example.

Hence, the shop server S3a of the fast-food shop delivery site S3 transfers HTML data to the information terminal T to display a homepage HP of the shop as illustrated in FIG. 4A.

Then, upon the user clicking a button of "To order screen" on the homepage HP displayed on the information terminal T, the shop server S3a displays an order screen OD, as illustrated in FIG. 4B, on the information terminal T.

On the order screen OD, the user inputs the number of desired merchandises to make the order, then clicks a button of "Order". Then the shop server S3a display an order confirmation screen CM showing the number of ordered merchandises and the total amount as illustrated in FIG. 4C.

Then, after the user confirms the order contents through the order confirmation screen CM, the user clicks the button of "Order" on the screen. Then the shop server S3c sends a URL of the map database site S2 to the information terminal T.

The information terminal T connects to the map database site S2 based on the URL sent from the shop server S3c. The map server S2a of the map database site S2 reads out required map data from the map information database S2b, and displays a map image M on the homepage as illustrated in FIG. 4d.

The steps until displaying the map image including the delivery area on the homepage are the same as those employed in a conventional map display system.

Areas on the displayed map is limited step by step, for example, this begins with the administrative divisions, proceeding to municipalities, to an area of a roughly reduced scale, and ending with an area of a detailed reduced scale.

Upon displaying the required map image M finally, the user designates a destination using a pointer P on the map image M.

In this way, each shop receives an order, and delivers the merchandise entered on the order screen OD to the destination designated on the map image M.

The designation of the destination on the map image M allows the user to easily designate the destination and the shop to smoothly check a location of the destination.

The terms and description used herein are set forth by way of illustration only and are not meant as limitations. Those skilled in the art will recognize that numerous variations are possible within the spirit and scope of the invention as defined in the following claims.

What is claimed is:

1. A service providing area retrieval system comprising:
a retrieval site, a shop site and a map database site each connected to a computer network,
said retrieval site comprising:
a retrieval server, and
a retrieval database storing data of genres of handled merchandises and service providing areas of registered shops,
said shop site comprising:
a shop server, and
a merchandise information database storing service request data of the shops,
said map database site comprising:
a map server, and
a map information database storing map image data,
wherein said retrieval server of said retrieval site is configured to retrieve shops whose genres of handled merchandises from said retrieval database correspond to a desired merchandise genre entered at an information terminal connected to said retrieval site and whose service providing area from said retrieval database includes a destination entered at the information terminal connected to said retrieval site, and is configured to display a map image on which the destination and retrieved shops are respectively indicated with landmarks, and after a shop is configured to be selected based on the map image, the information terminal is configured to connect to said shop site of the selected shop, and
wherein said shop site connected with the information terminal is configured to display a service request screen on the information terminal based on merchandise information data read out from said merchandise information database by said shop server, and
wherein an entry of a destination of the provided service on the service request screen displayed on the information terminal is configured to perform on a map image displayed based on the map information data read out from said map information database by said map server of said map database site.

2. The service providing area retrieval system according to claim 1, wherein said retrieval site further includes a registered user database storing user information, to retrieve user information from said registered user database based on an entry on the information terminal, and retrieve a list of shops capable of providing the service and said service request data based on the retrieved user information.

* * * * *